(12) United States Patent
Wilson

(10) Patent No.: US 8,784,007 B2
(45) Date of Patent: Jul. 22, 2014

(54) APPARATUS FOR COVERING A LAND AREA WITH A HEAVY WIDE WIDTH FLEXIBLE SHEETING

(71) Applicant: Walter N. Wilson, Bentlyville, PA (US)

(72) Inventor: Walter N. Wilson, Bentlyville, PA (US)

( * ) Notice: Subject to any disclaimer, the term of this patent is extended or adjusted under 35 U.S.C. 154(b) by 60 days.

(21) Appl. No.: 13/694,227

(22) Filed: Nov. 9, 2012

(65) Prior Publication Data

US 2014/0133917 A1  May 15, 2014

(51) Int. Cl.
*B09B 1/00* (2006.01)

(52) U.S. Cl.
CPC ...................................... *B09B 1/004* (2013.01)
USPC .............. 405/129.75; 405/129.9; 405/129.95; 242/557; 242/598.1; 242/598.2

(58) Field of Classification Search
USPC ................. 405/129.45, 129.6, 129.75, 129.9, 405/129.95; 242/557, 298.1, 298.2
See application file for complete search history.

(56) References Cited

U.S. PATENT DOCUMENTS

| | | |
|---|---|---|
| 5,304,014 A | 4/1994 | Slutz |
| 5,536,116 A | 7/1996 | Lammers |
| 6,264,400 B1 | 7/2001 | Gent |
| 6,299,094 B1 | 10/2001 | James |
| 6,592,295 B2 | 7/2003 | McPhillips |
| 7,494,301 B1 | 2/2009 | Neaton |
| 2002/0034422 A1 | 3/2002 | Kozak |
| 2004/0161300 A1 | 8/2004 | Kaul |
| 2011/0073701 A1* | 3/2011 | Ford .............................. 242/592 |

* cited by examiner

*Primary Examiner* — Benjamin Fiorello
*Assistant Examiner* — Kyle Armstrong
(74) *Attorney, Agent, or Firm* — Paul Bogdon

(57) ABSTRACT

Apparatus for covering a large land area with a long length, wide width heavy flexible sheeting comprising: a main framework adapted for mounting onto the end of a crowd of an excavator; a swivel assembly rotatably secured to the main framework; an elongated support member secured to the swivel assembly; a bearing assembly pivotably fixed to one end of the support member; a bushing assembly pivotably mounted to the other end of the support member; an arbor assembly including an elongated mandrel for receiving and supporting a roll of sheeting with one end of the mandrel journalled at one of its ends in the bushing assembly and the opposite end removably arranged in the bearing assembly.

17 Claims, 4 Drawing Sheets

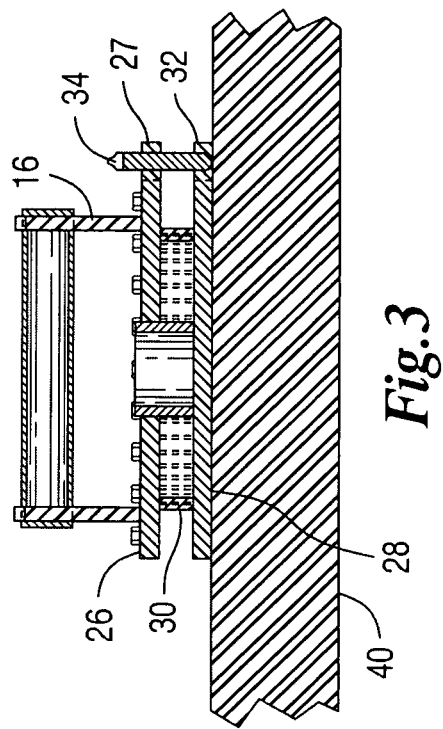
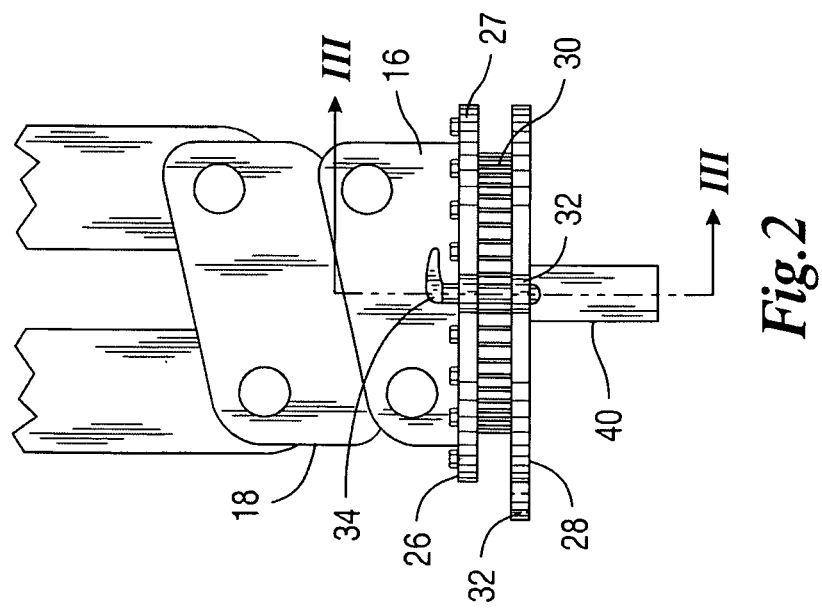

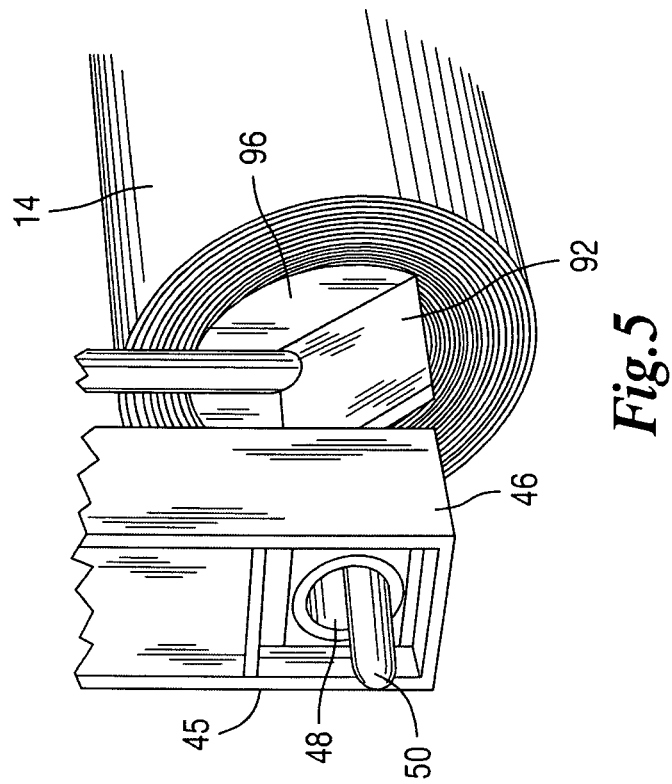
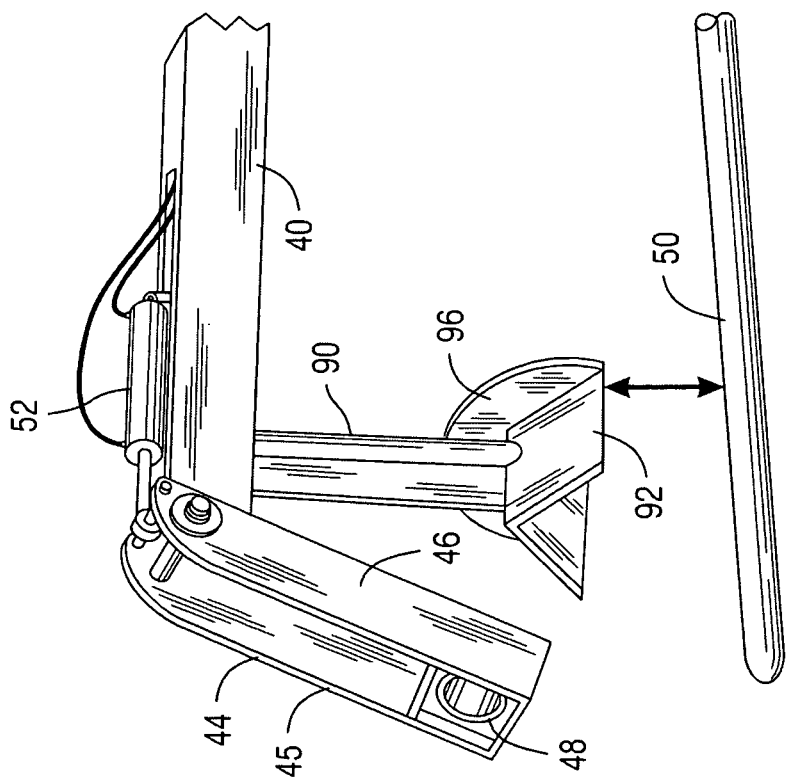

APPARATUS FOR COVERING A LAND AREA WITH A HEAVY WIDE WIDTH FLEXIBLE SHEETING

BACKGROUND OF THE INVENTION

1. Field of Invention

This invention relates to apparatus for covering a large land area with a long length, wide width heavy flexible sheeting, such as a geotextile clay liner.

2. Description of Prior Art

There are many artificial landfills that are excavated from sand, gravel, clay and other natural raw materials. The purpose for the different excavations is usually to serve as landfill dump sites for rubbish such as trash, garbage, and other waste materials. The excavations have also been used to receive the residue or refuse of the cleaning of mined products such as coal. As the artificial, excavated dump sites evolved the environmental regulatory rules and regulations governing their use became more strict and more complex, in an effect to prevent their causing more problems than they sought to solve. It has become a regulatory requirement that refuse dump sites be so constructed and formed that none of the materials that might arise from their contents could in any way seep into and pollute the surrounding environment. A typical regulatory requirement calls for lining the dump sites with an impervious liner or sheeting to prevent seepage of contaminants into the underlying ground. A typical liner would be a flexible geosynthetic or geotextile clay liner (GCL) which usually comes in a large heavy roll about 12-16.5 feet wide to about 135-150 feet long, weighing about 2200 to 3200 pounds. The GCL is, in essence, a sandwich of bentonite clay between two layers of heavy duty, flexible synthetic resin fabric. The liners are laid directly onto the ground formation surface with an overlap as required by the regulations. Theoretically, the laying of the liner would be accomplished by the simple means of threading the heavy roll of GCL onto a support rod, securing the support rod on a rigid beam, fixing the beam to a powered construction vehicle, carrying the roll along the dump site allowing the sheet liner to pay out and lay on the ground surface.

Typical dump sites range in size from about 6 acres to as large as about 450 acres and being as deep as around 380 feet. The sides if the dump site basin are typically sloped with so-called anchor trenches formed in them for receiving the flexible liners for securing them in place on the slopes. Abutments may also be formed on the surface of the dump site basin.

Various systems have been designed to lay out the GCL all including threading the roll onto a support rod fixed on a rigid beam and pulling the beam and rod to lay out the liner. One such device is that described in U.S. Pat. No. 6,264,400 of Keith A. Gent which includes in his assembly a long beam or framework which is attached behind a tractor clear of the ground, the beam having end plates between which are borne a support rod for carrying a roll of liner material such as GCL. The structure of the Gent device is somewhat complex and is clearly intended to be mounted to the rear of a tractor. The Gent device includes control means for adjusting the lateral angle of linkages secured to the framework for moving the roll of liner material to either side. A drawback of the Gent device that it could not be used in an excavation where maintaining the subgrade is important. Useable only with a tractor would require the tractor to travel over the subgrade and, in effect, destroy it. The Gent device would also require the tractor to move over anchor trenches and abutments, which would avoid proper placement of the liner as well as destroying the abutments. Similar to the Gent device is that described in U.S. Patent Application 2004/0161300 to Joseph B. Kaul et al which includes a complex arrangement of a pair of powered cradle rollers arranged to receive and disperse a heavy roll of liner sheeting such as GCL. As with the Gent device, the device of Kaul et al is arranged on the rear of a tractor requiring the tractor with the device to travel over subgrades, anchor trenches and abutments, destroying or deteriorating the subgrades and abutments and avoiding proper placement of the liner. Another drawback the Gent and Kaul et al devices is that they require another vehicle, such as a forklift, to place the rolls of liner material onto the rollers of the respective devices. Worker or workers would be needed for handling the rolls of liner material and placing them onto the arbors of the devices, creating a safety hazard for pinched fingers and such like, as well as requiring time consuming operations by the workers such as guiding the arbors into bearings, securing the arbors in the bearings, and latching them in place.

Another device for laying sheeting on a ground surface is that of U.S. Pat. No. 5,304,014 to John D. Slutz. This device is somewhat similar to those of Gent and Kaul et al including a complex framework arrangement adapted for mounting engagement on the rear of a construction vehicle such as a tractor. The Slutz device includes a pair of transversely extending arms which carry a journalled arbor assembly between them. The arbor assembly includes a mandrel for supporting a roll of liner material. A drive mechanism serves to apply a rotational motion to the mandrel for either unrolling or rolling the liner off or back onto the mandrel No provision is made for laterally positioning the liner for overlapping liners where required. As with the Gent and Kaul et al devices, the Slutz device would be driven by a tractor over subgrade, anchor trenches, and abutments, destroying the subgrades and abutments, and avoiding proper placement of this liner. Also, as with the previously described devices, the Slutz device would require a separate vehicle, such as a forklift and assisting workers, for safety hazard and time consuming loading and securing rolls of liner. The Slutz device is also intended to cover landfill sites when they are not being worked and to take up the sheeting material when it is desired to work the area. Slutz does not suggest the use of GCL or other heavy liner sheeting.

The device of U.S. Pat. No. 7,494,301 to Daniel J. Neaton is for laying an erosion control blanket on a sloping bank of a land site. A lightweight flexible blanket, unlike heavy GCL, is carried on a spindle cantilevered on a support structure communicating with a hydraulic rotary actuator. The support structure is secured to the front end of a track loader or the like. Neaton does not suggest structure for carrying and dispensing heavy liner sheeting, nor is provision made or structures provided for the overlapping of liner sheeting. As with all of the previously described devices the Neaton device would move its lightweight sheeting over subgrades, anchor trenches, and abutments destroying or deteriorating the subgrades and abutments, and avoiding proper placement of heavy liner sheeting.

The devices of U.S. Pat. No. 5,536,116 to Arville Lammers et al, U.S. Pat. No. 6,558,080 to Randall Jeff Kozak, and U.S. Pat. No. 6,299,094 to Forrest Hood James, Jr., are all somewhat similar in structure to the previously described devices and have the same drawbacks. Each device would require travel over subgrades, anchor trenches, and abutments; would necessitate the need of a separate vehicle such as a forklift to load a roll of liner onto an arbor; would require a worker or workers for assisting the loading and securing the rolls in place on a mandrel or spindle. Additionally, the devices of Lammers and Kozak are arranged for spreading material over this sheeting after it is laid out with Lammers using a compactor which would destroy the subgrade. The Lammers, Kozak, and James, Jr. devices are not constructed for laterally moving the liner roll and cannot overlap the sheeting.

The apparatus for covering a large land area with a heavy, flexible sheeting of the present invention overcomes the problems inherent in known designs of devices for laying liners or sheeting on ground surfaces. The liner laying apparatus of the present invention is arranged to be secured to the working arm, so-called crowd, of an excavator and allows precise placing of a heavy, wide width, flexible sheeting, such as GCL, on a land area without it being driven over subgrade, anchor trenches, or abutments. The apparatus (device) of the present invention allows liners to be overlapped without having to precisely guide the course of the excavator. Additionally, the device of this invention does not require a separate vehicle to load a roll, and is, in effect, self-loading, nor does it require a worker or workers to load the roll or secure it in place, making it safe against injuries since no person needs to touch the rolls or the device itself. As well as being safe in its use, the loading and unloading is efficient taking very little time. Also, the device of this invention used with an excavator is useable in difficult areas where tractors, skid steer vehicles, and such like vehicles cannot travel and lay liner sheeting.

SUMMARY OF THE INVENTION

The apparatus of the present invention for covering a large land area with a wide width flexible sheeting, preferably comprises: an elongated rotatable framework adapted for mounting engagement onto the end of a moveable work arm, called a crowd, of a powered construction vehicle such as an excavator, and including an elongated support member; a downwardly extending bushing assembly supported at one end section of the support member and having a rotatable free lower end; a downwardly extending pivotable bearing arm assembly secured to the other end section of the support member; an arbor assembly including an elongated mandrel sized and shaped for receiving and supporting a roll of sheeting such as GCL and having one end thereof journalled in said rotatable lower end of said bushing assembly and its opposite other end removably received in a lower end section of the bearing arm assembly; and wherein when the bearing arm is pivoted away from the other end section of the support member the mandrel is released from the bearing arm assembly and is pivoted downwardly and when the bearing arm assembly is pivoted toward the other end section of the support member the other end of the mandrel is received in the lower end section of the bearing arm assembly.

In its preferred form the apparatus, also referred to as the device, includes a mounting bracket attachable to a crowd of an excavator and a rotatable swivel assembly secured to the lower portions of the mounting bracket and wherein the elongated support member is secured at its midsection to the swivel. The elongated support member has the mandrel attached to it with the swivel assembly rotatable when a roll of liner sheeting, for example, engages a section of inclined ground surface as the excavator moves on a generally horizontal level of ground. In other words, whenever a section of ground is at an angle or not on a horizontal plane, the crowd of the excavator moving horizontally moves the device towards the angular surface with the swivel rotating, should the angular surface require it, such that the liner will unroll onto the angular surface.

The preferred form of the device would also include a guide bracket for engaging the mandrel to align it with the bearing arm assembly such that when the bracket arm assembly is pivoted toward the middle of the support member and mandrel, the mandrel will be received in the bearing arm assembly. Also, the device could include a removable pin and stop arrangement for securing the swivel from rotating. Stop plates could be arranged on the mandrel for fixing the position of the roll of liner and for possibly preventing the roll from damaging the bushing and bearing assemblies, which bushing assembly holds the mandrel in place while allowing it to pivot downwardly when the mandrel is released from the bearing arms assembly.

The apparatus/device of this invention for covering a large land area with a wide width sheeting such as GCL engaged with the crowd of an excavator, places liner sheeting on the ground surface of a dump site without the excavator moving on any subsurface, anchor trenches, or abutments and places the liner precisely where needed included in the anchor trenches. Damage or deterioration of the subsurface is avoided and the liner fixed from sliding downwardly on an inclined surface. There is no need to have a forklift or the like for loading a roll of liner sheeting on the mandrel nor a need for a worker to guide, touch, or in any way handle the liner roll or secure the roll to the device. Thus, the device, being self-loading, is very safe by avoiding the need of human handling when loading roll of liner sheeting. Additionally, the loading operation takes very little time, literally seconds. The use of an excavator with the device permits use of the device in difficult areas where tractors and skid steer vehicles could not be used.

Various other advantages, details, and modifications of the apparatus/device of the present invention will become apparent as the following description of a certain referred embodiment proceeds.

BRIEF DESCRIPTION OF THE DRAWINGS

In the accompanying drawings I show a certain preferred embodiment of the apparatus/device of my present invention in which:

FIG. 2 is an enlarged elevation view of part of the support member of the device of FIG. 1 and showing details of construction of the swivel plate assembly and the main framework connected to the end of the crowd of the excavator;

FIG. 3 is a view looking along the line III-III of FIG. 2;

FIG. 4 is an enlarged perspective view of the bearing arm assembly of the device at one end of the support member, part of the support member, part of the mandrel and guide bracket for aligning the mandrel with the bearing of the bearing assembly and showing the bearing arm assembly pivoted away from the other end of the support member with the mandrel released from the bearing;

FIG. 5 is an enlarged perspective view of part of the bearing assembly of FIG. 4 showing the end of the mandrel in the bearing of the bearing arm assembly with the mandrel supporting a roll of liner shown in part.

DESCRIPTION OF A PREFERRED EMBODIMENT

Figure 1:
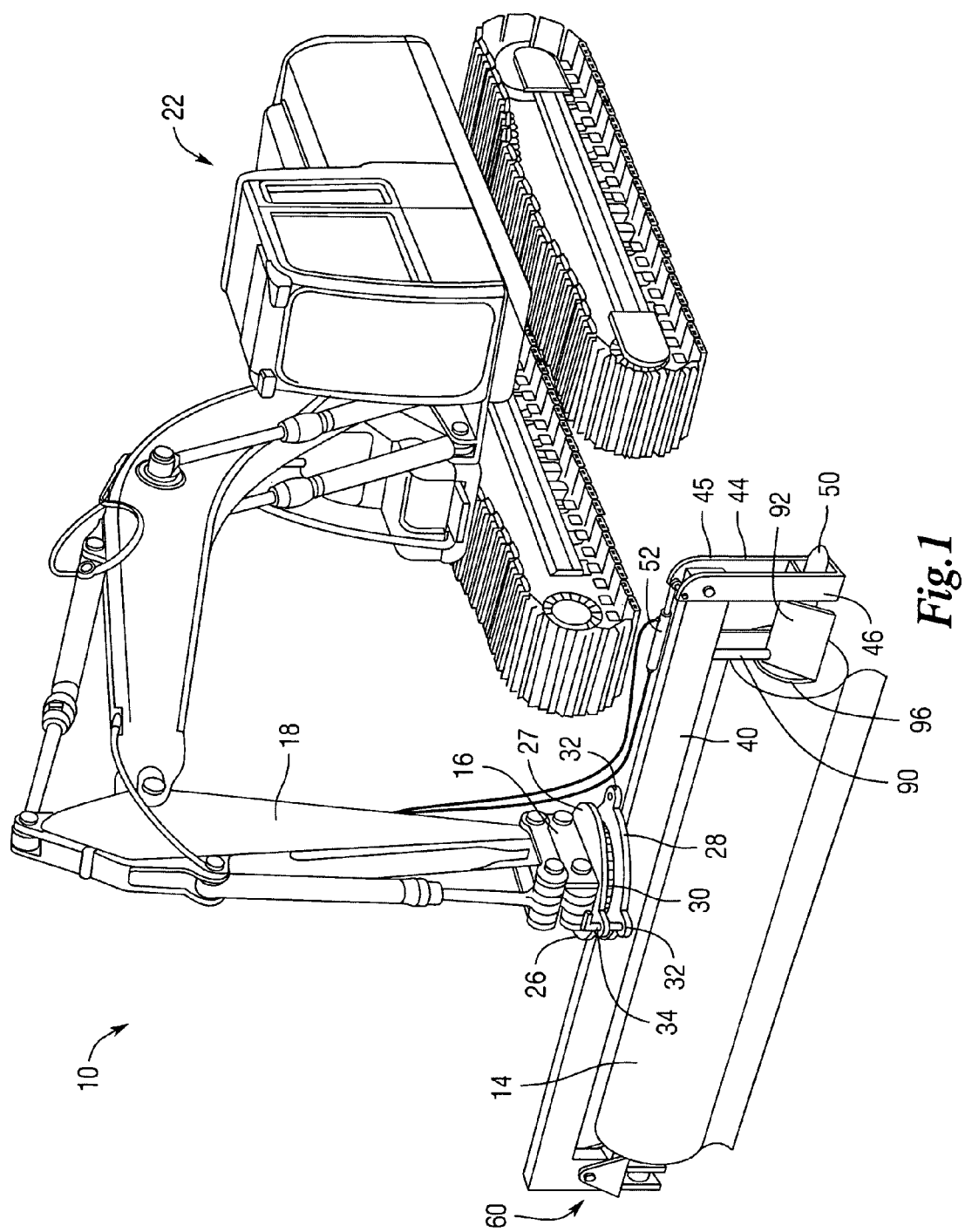
FIG. 1 is a perspective view of the apparatus/device for covering a large land area with a wide width flexible sheeting such as GCL embodying the present invention showing the device attached with the working arm/crowd of an excavator and showing a roll of liner sheeting on the mandrel of the device with the mandrel supported between bearing arm and bushing assemblies.

Referring now to the drawings, and particularly, to FIG. 1, there is shown an apparatus 10, also referred to as device 10, for covering a large land area such as landfill or dump site for receiving coal cleaning refuse or residue, for example, with a heavy, wide width flexible liner or sheeting such as a geosynthetic or geotextile clay liner, called GCL. A roll 14 of GCL is show supported by the device 10. A typical roll 14 of GCL would be between 12 and 16.5 feet wide to about 135-150 feet long, weighing about 2200 to 3200 pounds. As well known, the GCL is somewhat of a sandwich of benonite clay between two layers of heavy duty flexible synthetic resin fabric. The device 10 includes a main frame or head bracket 16, better shown in FIG. 2, shaped and adapted to be joined to the end of a working arm or crowd 18 of an excavator 22, which could be a med-sized excavator such as PC 200 Kamatsu excavator. Usually the excavator carries on its crowd 18 a conventional hydraulically-actuated bucket with its movement being controlled by the operator of the excavator. With the device 10 the usual bucket is removed from the crowd 18 and the end of the crowd coupled to the head bracket 16. As shown clearly in FIGS. 2 and 3, a swivel assembly 26 is rotatably secured to the head bracket 16 and includes an upper plate 27 and lower plate 28 sandwiching a circular shaped, externally geared swivel plate or swivel 30, rotatably journalled as shown in FIG. 3 to the head bracket 16. Arranged at 90° intervals on both the upper plate 26 and the lower plate 28 of the swivel assembly 26 are four radially extending pin stops 32 having openings therethrough. Although more or less pin stops could be used. A stop pin 34 is provided and is sized for extending though the openings of vertically aligned pin stops 32 of the upper plate 27 and lower plate 28 of the swivel assembly 26 for securing the swivel assembly 26 from rotating.

Secured at its midsection as by welding, for example, to the lower plate 28 of the swivel assembly 26 is an elongated support member 40 having a box shaped construction but not limited to that shape, having at one end section a bearing arm assembly 44 shaped like a clevis of generally parallel arms 45 and 46 secured to each other at lower distal end sections, as shown, and pivotably secured at one end section of the support member 40. Arranged at and secured to a lower end section of the bearing arm assembly 44 is an oilite bearing 48 for receiving the free or one end of a mandrel 50 of an arbor assembly upon which would be supported a roll of liner 14. A double acting hydraulic cylinder assembly 52 has the free end of the piston rod secured to an upper end section of the bearing arm assembly 44, the hydraulic cylinder operated through usual hydraulic fluid lines by the operator of the excavator 22 for pivoting the bearing arm assembly 44 away from and toward the other end of the support member 40. As shown in FIG. 4, the bearing arm assembly 44 is pivotably moved away from the other end of the support member 40 whereby the mandrel 50 is released from the bearing 48 and, as will be described hereinafter, pivoted downwardly and away from the bearing arm assembly 44 for receiving or releasing a roll of liner 14 on or from the mandrel 50.

Figure 6:
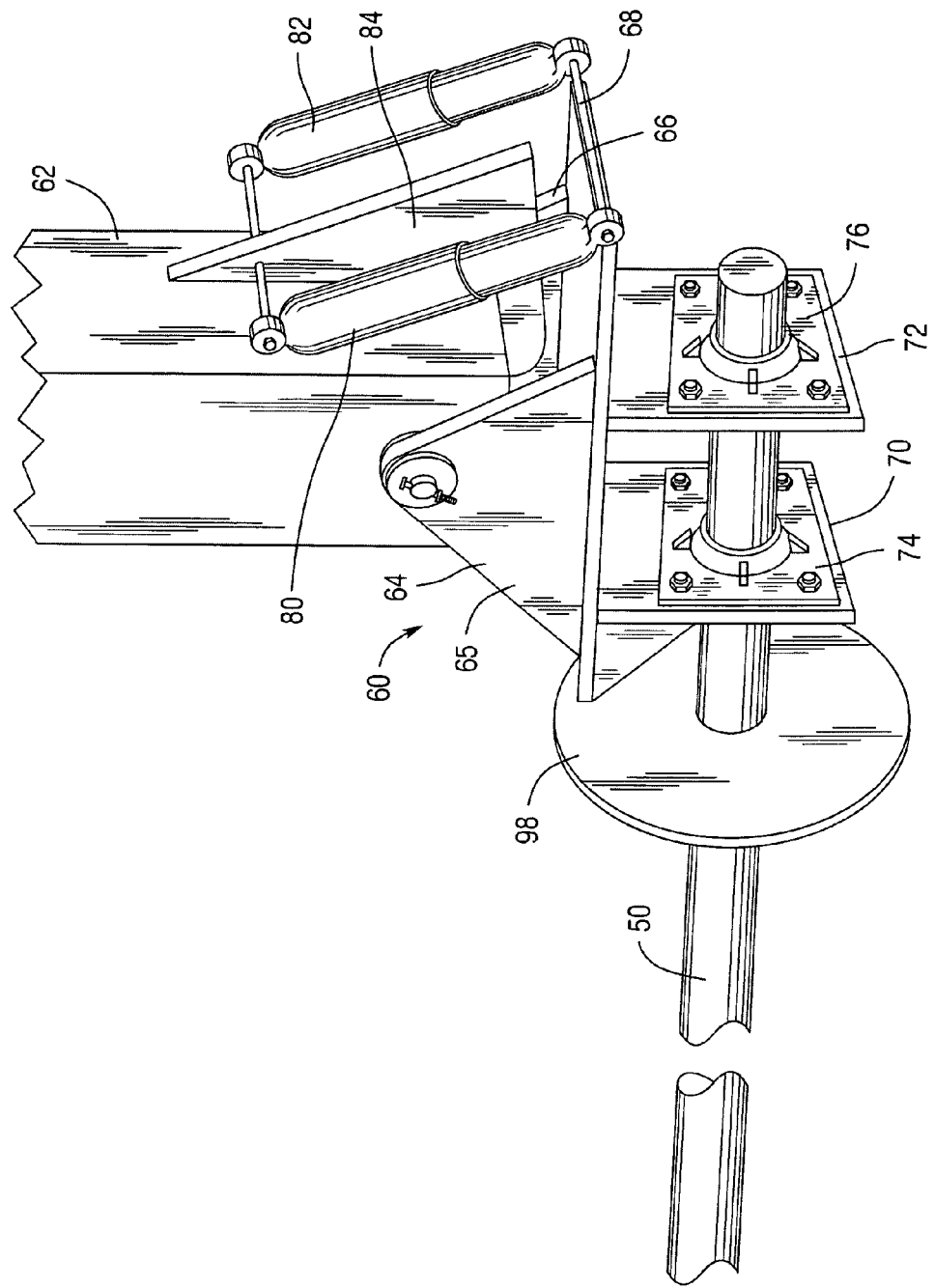
FIG. 6 is an enlarged perspective view of the bushing assembly of the device with the other end of the mandrel journalled in the bushings of the bushing assembly and part of the support arm which is connected to the other end of the member of the device.

Referring to FIGS. 1 and 6, a bushing arm assembly 60 is fixed to the other end section of the support member 40 and includes a downwardly extending support arm 62 fixed at its upper end to the other end of the support member 40. A bushing housing 64, having opposite disposed parallel plates 65 and 66 pivotably secured to the lower end section of support arm 62. The plates 65 and 66 are secured as by weldments to a generally horizontal plate 68 to which are secured a pair of parallel downwardly extending bracket plates 70 and 72. Secured to the bracket plates 70 and 72 are bushing members 74 and 76 sized and shaped for rotatably receiving the other end section of the mandrel 50 while securing the mandrel 50 in place. A downwardly extending right triangle-shaped stop plate 84 is secured to the support arm 62 with its lower end, as shown in FIG. 5, spaced from the horizontal plate 68 for limiting the downward pivotable movement of the bushing housing 64 and mandrel 50. A pair of shock absorbers 80 and 82 are fixed between the stop plate 84 and the horizontal plate 68 for slowing the downward pivoting of the bushing housing 64 and mandrel 50.

Referring to FIGS. 1 and 4, there is shown a guide assembly 90 for aligning and guiding the one end of the mandrel 50 into bearing 48 whenever the bearing arm assembly 44 is pivoted toward the other end of the support member 40. The guide assembly 90 includes a V-shaped strut 92 which would engage the mandrel 50 aligning it to the bearing 48 whenever the mandrel 50 with a roll of liner 14 is pivoted upwardly and the bearing arm assembly 44 is pivoted under the movement force applied by the hydraulic cylinder 52 toward the other end of this support member 40. FIG. 5 shows the mandrel 50 with its free end within the bearing 48.

Referring to FIGS. 1, 4, and 5, there is shown a first stop plate 96 secured to the lower end of the guide assembly 90 at the V-shaped strut 92. A second stop plate 98 is shown clearly in FIG. 6 secured to the mandrel 50 as by weldments adjacent to the inner end of the of the horizontal plate 68 of the bushing assembly 60. The first and second stop plates 96 and 98 serve to secure a roll of liner 14 in position from shifting along the mandrel 50.

In its operation, the device 10 is initially loaded with a roll of liner 14 such as one of GCL by positioning the device 10 connected with the crowd 18 of the excavator 22 in the vicinity of the roll of liner 14. The operator of the excavator 22 will actuate the hydraulic cylinder 52 to pivot the bearing arm assembly 44 outwardly as shown in FIG. 4 to release the mandrel 50 from the bearing 48, the mandrel 50 pivoting downwardly and away from the bearing assembly 44. The excavator 22 will be moved toward the roll of liner 14 with the mandrel 50 receiving the roll onto itself and into engagement of the inner end of the roll with the second stop plate 98. The operator then actuates the crowd 18 by the hydraulic cylinder shown on FIG. 1 to engage the roll of liner 14 with the ground surface pivoting the mandrel 50 loaded with the roll of liner until the mandrel engages the V-shaped strut 92 where the free end of the mandrel will be aligned with the bearing 48 when the bearing arm assembly 44 is pivoted downwardly and the end of the mandrel received in the bearing 48. The loading of the roll of liner 14 onto the mandrel 50 is achieved safely since no hands of workers need touch the roll of liner 14 or any part of the device 10 thus avoiding any possible bodily injuries. The loading operation is efficiently accomplished in a short order of time, in seconds.

During the loading operation, the device 10 is secured from rotating by a pin 34 inserted in the aligned pin stops 32 on the upper plate 27 and lower plate 28 of the swivel assembly 26. After the completion of the loading operation the pin 34 is simply removed from the pin stops 32 and the device 10 moved along the excavation ready to lay liner.

The excavator 22 moves alongside the ground surface to be covered with the roll of liner 14 on the mandrel 50 positioned to lay the liner, the excavator alongside the device 10 and the heavy liner unrolling and laying on the ground surface. The mobile excavator 22 and the device 10 allow the liner to be precisely placed, such as aligning the edges for precise overlap with previously placed liner. The rotation of the support member 40 and the roll of liner 14 on the mandrel 50 with the excavator 22 alongside of the device, and not needed to be precisely guided, allows placing of the liner on termination points such as anchor trenches, as well as on areas that were previously covered with liner such as stop and start points at the top and bottom of application areas. The liner may be laid on subgrades without disturbing it as the excavator 22 is driven alongside the application area. Where subgrade integrity is important, the subgrade will be covered without in any way disturbing the subgrade.

When the roll of liner 14 is loaded into the mandrel 50 its inner end engages the second stop plate 98 and its outer end engages the first stop plate 96 and as such the roll of liner is secured against shifting on the mandrel 50.

When the covering operation of a single roll of liner 14 is completed the mandrel 50 is released from the bearing 48 of the bearing arm assembly 44 as the operator of the excavator 22 actuates the hydraulic cylinder 52 to pivot the bearing arm assembly 44 away from the support member 40, as shown in FIG. 4. The mandrel 50 will pivot downwardly and the core of the roll of liner 14 will simply slide off the mandrel 50. The mandrel 50 will be ready to receive a full roll of liner 14 with the covering or laying of liner operation ready to resume.

The process of covering large land areas, such as dump sites, with heavy, flexible liner sheeting such as GCL as noted in the introductory section of this application by using the device 10 of this invention with an excavator may be achieved efficiently, quickly, precisely and safely without threatening the integrity of subgrades, or damaging abutments, and anchor trenches. Also, the moving excavator need not be precisely driven since the device 10 will rotate and the crowd 18 positioned to place the device 10 along the contour of the excavation without having to drive on the contour as would be the case with tractors and skid steer vehicles used to lay liner.

It should now be clearly apparent how the device 10 of this invention achieves the advantages as spelled out herein of laying heavy, wide width, flexible sheeting such as GCL on large land areas such as dump sites for receiving residue of coal cleaning, for example. Among the other advantages to those indicated throughout this specification are those of simple construction, simple and quick connecting with the crowd of an excavator, and of simplicity in the use. It should also be apparent to those skilled in the art as to modifications of the device 10 of this invention.

While I have described and illustrated a certain present embodiment of this invention, it is to be distinctly understood that the invention is not limited thereto but may be otherwise embodied within the scope of the following claims.

I claim:

1. Apparatus for covering a large land area with wide width, flexible sheeting, comprising:
    an elongated rotatable framework adapted for mounting engagement into the end of a movable work arm of a powered construction vehicle, and including an elongated support member;
    a downwardly extending bushing assembly supported at one end section of said support member and having a pivotable free lower end section;
    a downwardly extending elongated bearing arm assembly pivotably secured to the other end section of said support member;
    an arbor assembly including an elongated mandrel sized and shaped for receiving and supporting a roll of sheeting and having one end thereof journalled in said pivotable lower end of said bushing assembly and its opposite other end removably received in a lower end section of said bearing arm assembly; and
    wherein when said bearing arm assembly is pivoted away from said other end section of said support member, said mandrel is released from said bearing arm assembly and is pivoted downwardly and when said bearing arm assembly is pivoted toward said other end section of said support member, said other end of said mandrel is received in said lower end section of said bearing arm assembly.

2. The apparatus as set forth in claim 1 wherein said rotatable framework includes a mounting bracket adapted to be secured to the end of a movable work arm of a powered construction vehicle and a rotatable swivel plate assembly secured to the lower end of said mounting bracket; and wherein said elongated support member is secured to the lower end of said swivel plate assembly.

3. The apparatus as set forth in claim 2 wherein said swivel plate assembly includes at least four arcuatley spaced radially extending stop members; and including removable locking means for engaging any of said stop means for securing said framework at a select position.

4. The apparatus as set forth in claim 3 wherein said locking means is elongated sized and shaped for removeably engaging a pair of aligned said stop members.

5. The apparatus as set forth in claim 2 wherein said swivel plate assembly includes four radially extending stop members generally uniformly arcuately spaced 90° apart; and including removable locking means for engaging any of said stop members for securing said framework at a select position dependent on which stop members are engaged by said locking means.

6. The apparatus as set forth in claim 1 including a guide bracket means fixed to and extending downwardly from said other end section of said support member and arranged to removeably engage said mandrel at said other end section thereof for aligning said mandrel with said lower end section of said bearing arm.

7. The apparatus as set forth on claim 1 wherein said elongated bearing arm has an upper end and a lower end and is pivotably secured at an intermediate section thereof to said other end section of said support member.

8. The apparatus as set forth in claim 7 including power means engaging said bearing arm at an upper portion thereof for impressing a moving force on said bearing arm.

9. The apparatus as set for the in claim 8 wherein said power means includes a hydraulic drive assembly.

10. The apparatus as set forth in claim 1 including removable locking means engageable with said framework for securing said framework from rotation.

11. The apparatus as set forth in claim 1 including a stop plate means secured at said one end section of said mandrel for limiting the positioning of a roll of sheeting on said mandrel spaced from said free lower end of said bushing assembly.

12. The apparatus as set forth in claim 1 wherein said framework, said bushing assembly, said bearing arm assembly, arbor assembly and said mandrel are constructed and arranged such that when said apparatus for covering is lowered toward a land area and the apparatus is moved by a construction vehicle a roll of sheeting on said mandrel will unroll and the sheeting will be placed on the surface of the land area.

13. Apparatus for covering a large land area with a heavy, wide width, flexible sheeting such as a geotextile clay liner, comprising:
    a main framework shaped, sized and adapted for mounting engagement onto the end of a moveable work arm assembly called a crowd of a powered excavator vehicle;

a swivel plate assembly rotatably secured to the underside of said main framework;

an elongated support member fixed at an intermediate section thereof to the underside of said swivel plate assembly for rotation with said swivel plate assembly;

a downwardly extending bearing arm assembly having a proximate end pivotably fixed to one end section of said support member and a free lower distal end;

power means engaging said bearing arm at an upper end portion thereof for impressing a moving force on the pivotable bearing arm;

a downwardly extending bushing assembly pivotably mounted on the other end section of said support member;

an arbor assembly including an elongated mandrel sized and shaped for receiving and supporting a roll of heavy weight liner sheeting and having one of its ends journalled in said bushing assembly and its opposite end removably arranged in the lower end section of said bearing arm;

wherein when aid bearing arm is pivoted away from said other end of said support member the mandrel is released from said bearing arm and is pivoted downwardly whereby a roll of heavy sheeting may be placed on said mandrel; and when said bearing arm is pivoted toward said opposite end of said mandrel said opposite end of said mandrel is received in said bearing arm;

removable locking means engageable with said swivel plate assembly for selectively securing said swivel plate from rotation; and wherein said main framework, said swivel plate assembly, said support member, said support arm, said bearing arm, said power means, said bushing assembly, said arbor assembly, and said mandrel are constructed and arranged such that when said apparatus for covering is lowered toward a land area and the apparatus is moved by an excavation vehicle a roll of heavy sheeting on said mandrel will unroll and the sheeting placed on the surface of the land area.

14. The apparatus as set forth in claim 13 including a guide bracket means fixed to and extending downwardly from the other end section of said support member and arranged to removably engage said mandrel of the other end section thereof for aligning said mandrel with said lower end section of said bearing arm.

15. The apparatus as set forth in claim 13 wherein said power means includes a hydraulic drive assembly.

16. The apparatus as set forth in claim 13 wherein said swivel plate includes a plurality of radially extending, arcuately spaced stop members; and wherein said removable locking means cooperates between a pair of aligned said stop members.

17. The apparatus as set forth in claim 13 including a stop plate means secured at said one end section of said mandrel for limiting the positioning of a roll of heavy sheeting on said mandrel and spaced from said bushing assembly.

\* \* \* \* \*